United States Patent [19]
Li

[11] Patent Number: 5,774,588
[45] Date of Patent: Jun. 30, 1998

[54] METHOD AND SYSTEM FOR COMPARING STRINGS WITH ENTRIES OF A LEXICON

[75] Inventor: Liang Li, Monroe, Conn.

[73] Assignee: United Parcel Service of America, Inc., Atlanta, Ga.

[21] Appl. No.: 477,481

[22] Filed: Jun. 7, 1995

[51] Int. Cl.$^6$ .............................. G06K 9/36; G06K 9/72
[52] U.S. Cl. .......................................... 382/230; 382/229
[58] Field of Search .................................. 382/229, 230, 382/231

[56] References Cited

U.S. PATENT DOCUMENTS

| | | | |
|---|---|---|---|
| 3,969,698 | 7/1976 | Bollinger et al. | 340/146.3 WD |
| 3,995,254 | 11/1976 | Rosenbaum | 340/146.3 WD |
| 4,010,445 | 3/1977 | Hoshino | 340/146.3 WD |
| 4,058,795 | 11/1977 | Balm | 340/146.3 WD |
| 4,754,489 | 6/1988 | Bokser | 382/229 |
| 4,771,385 | 9/1988 | Egami et al. | 364/419 |
| 4,799,271 | 1/1989 | Nagasawa et al. | 382/229 |
| 4,903,206 | 2/1990 | Itoh et al. | 364/419 |
| 4,979,227 | 12/1990 | Mittelbach et al. | 382/229 |
| 5,050,218 | 9/1991 | Ikeda et al. | 382/100 |
| 5,062,143 | 10/1991 | Schmitt | 382/229 |
| 5,133,023 | 7/1992 | Bokser | 382/229 |
| 5,136,289 | 8/1992 | Yoshida et al. | 341/67 |
| 5,261,009 | 11/1993 | Bokser | 382/229 |
| 5,276,741 | 1/1994 | Aragon | 382/229 |
| 5,325,444 | 6/1994 | Cass et al. | 382/229 |
| 5,329,609 | 7/1994 | Sanada et al. | 395/2.6 |

FOREIGN PATENT DOCUMENTS 0 518 496 12/1992 European Pat. Off. .......... G06F 7/02

OTHER PUBLICATIONS

William B. Cavnar and Alan J. Vayda, Using Superimposing Coding of N–gram Lists for Efficient Inexact Matching, Environmental Research Institute of Michigan, pp. 253–267, 480–493.

Owolabi et al., "Fast Approximate String Matching," *Software—Practice and Experience*, vol. 18, No. 4, pp. 387–393 (Apr. 1988).

Takahashi et al., "A Spelling Correction Method and Its Application to an OCR System," *Pattern Recignition*, vol. 23, No. 3/4, pp. 363–377 (Jan. 1990).

Zobel et al., "Finding Approximate Matches in Large Lexicons," *Software—Practice and Experience*, vol. 25, No. 3, pp. 331–345 (Mar. 1995).

William J. Masek and Michael S. Paterson, "A Faster Algorithm Computing String Edit Distances," of Journal Computer And System Sciences, 20, 18–13 (1980), pp. 18–31.

(List continued on next page.)

*Primary Examiner*—Andrew Johns
*Assistant Examiner*—Monica S. Davis
*Attorney, Agent, or Firm*—Jones & Askew, LLP

[57] ABSTRACT

A system and method for more efficiently comparing an unverified string to a lexicon, which filters the lexicon through multiple steps to reduce the number of entries to be directly compared with the unverified string. The method begins by preparing the lexicon with an n-gram encoding, partitioning and hashing process, which can be accomplished in advance of any processing of unverified strings. The unknown is compared first by partitioning and hashing it in the same way to reduce the lexicon in a computationally inexpensive manner. This is followed by an encoded vector comparison step, and finally by a direct string comparison step, which is the most computationally expensive. The reduction of the lexicon is accomplished without arbitrarily eliminating any large portions of the lexicon that might contain relevant candidates. At the same time, the method avoids the need to compare the unverified string directly or indirectly with all the entries in the lexicon. The final candidate list includes only highly possible and ranked candidates for the unverified string, and the size of the final list is adjustable.

17 Claims, 6 Drawing Sheets

OTHER PUBLICATIONS

Roy Lowrance and Robert A. Wagner, "An Extension of the String–to–String Correction Problem," Journal of the Association for Computing Machinery, vol. 22, No. 2, Apr. 1975 pp. 177–183.

Robert A. Wagner and Michael J. Fischer, "The String–to–String Correction Problem," Journal of Association for Computing Machinery, vol. 21, No. 1, Jan. 1974, pp. 168–173.

Sun Wu and Udi Manber, "AGREP—A Fast Approximate Pattern–Matching Tool," Dept. of Computer Science University of Arizona.

Edward M. Riseman, "A Contexual Postprocessing System For Error Correction Using Binary N–Grams" IEE Transactions On Computers, vol. C–23, No. 5, May 1974, pp. 480, 481–493.

EDIT DISTANCE

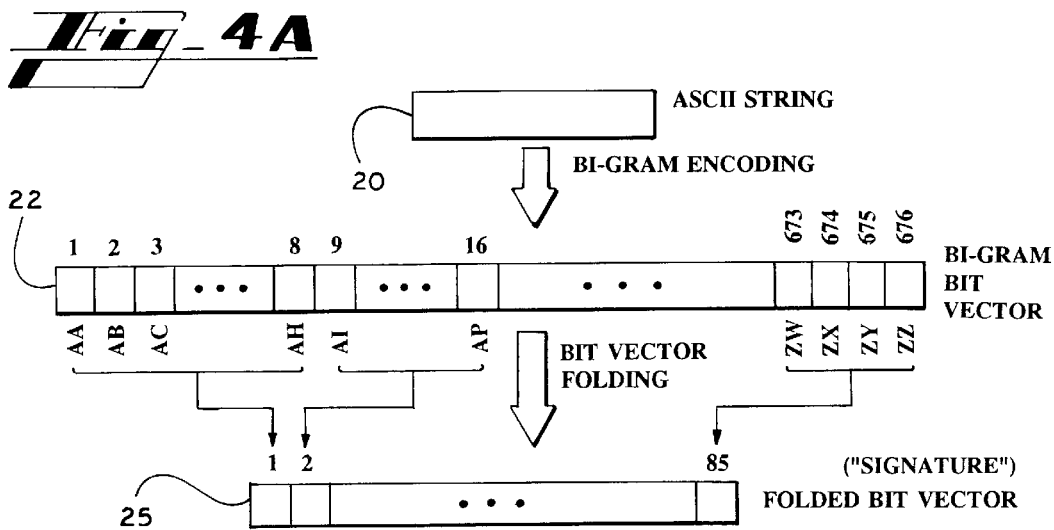
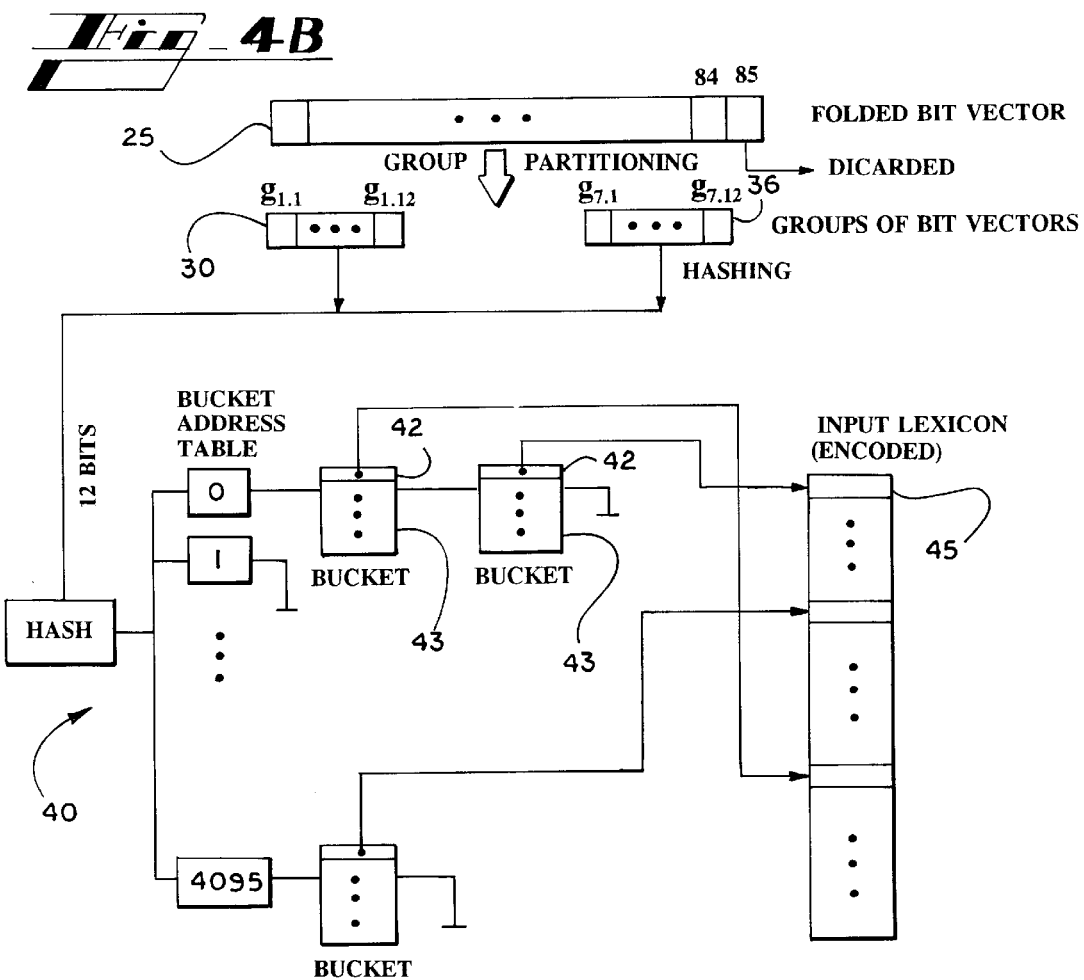

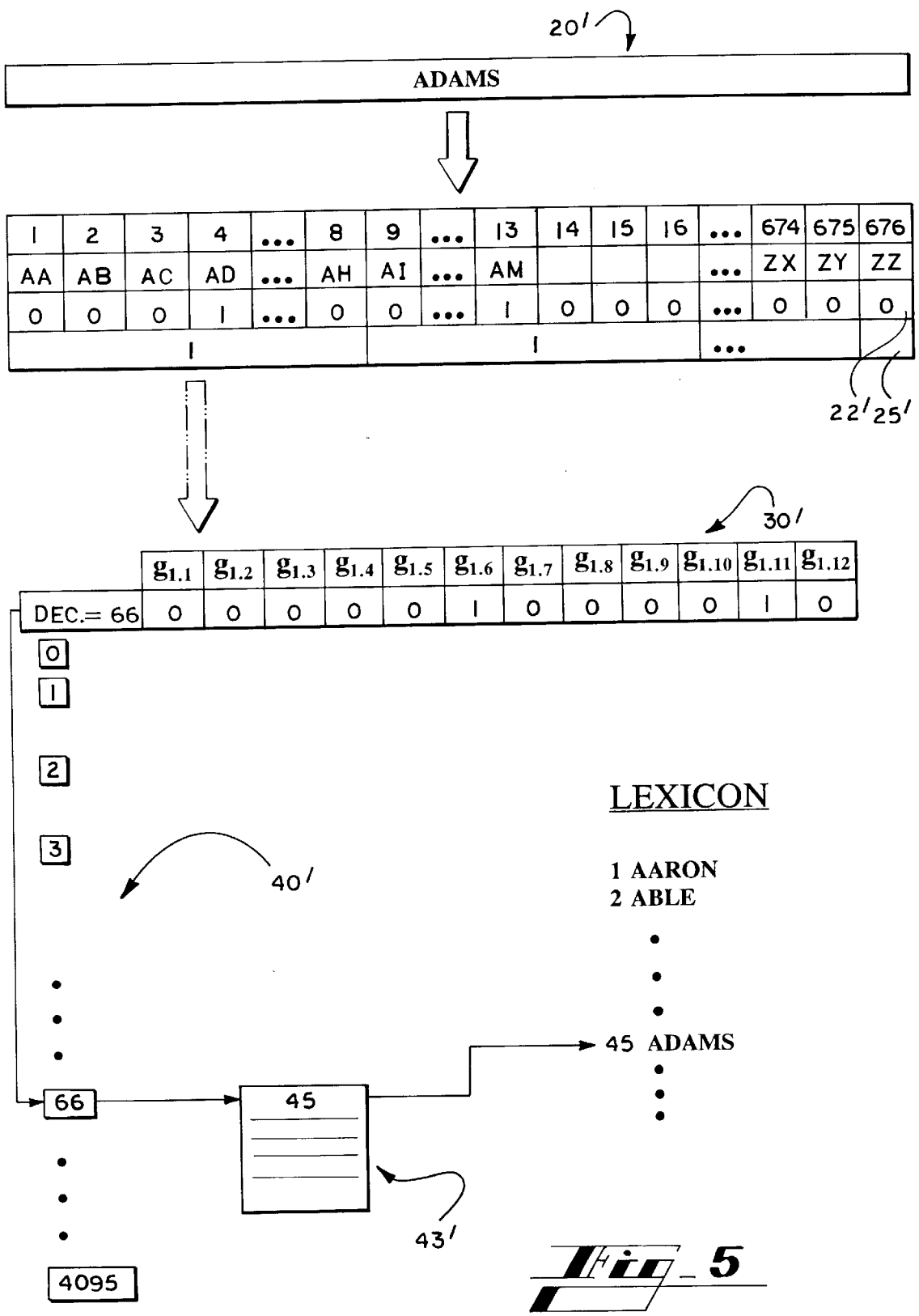
Fig_5

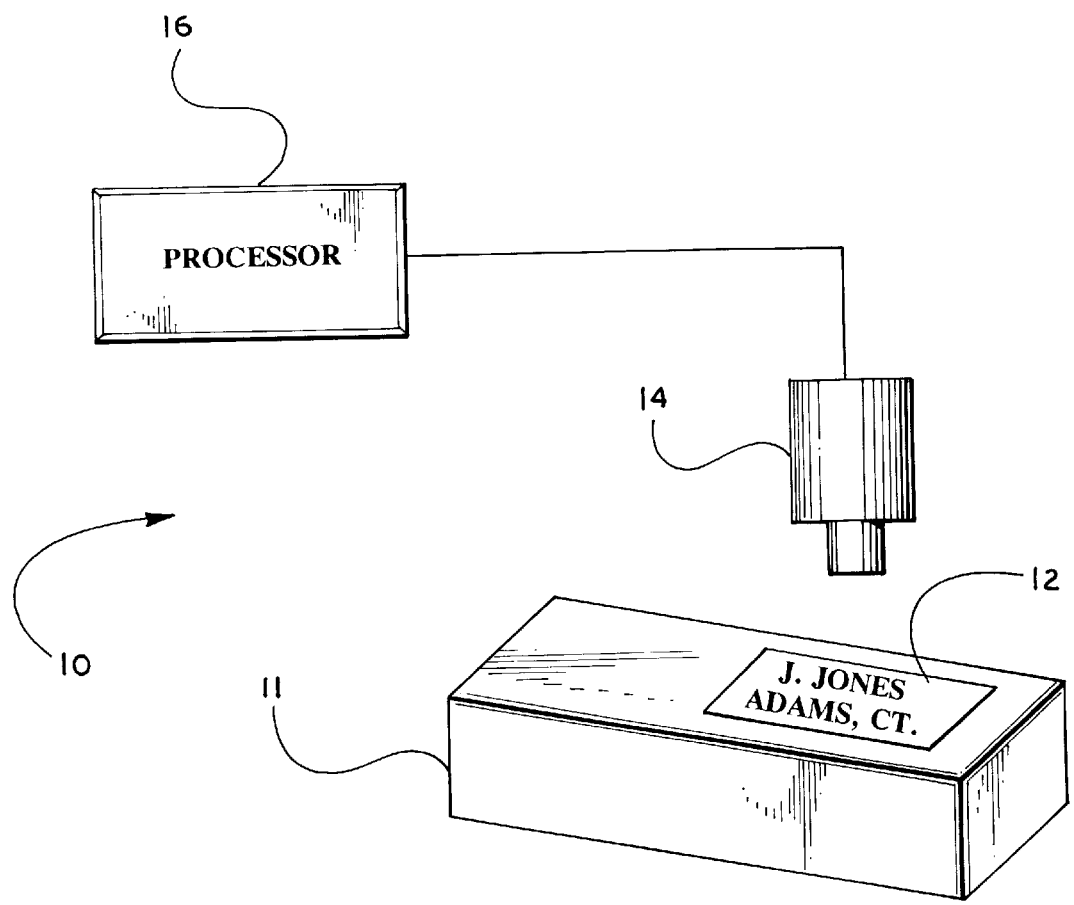
Fig_6

METHOD AND SYSTEM FOR COMPARING STRINGS WITH ENTRIES OF A LEXICON

TECHNICAL FIELD

This invention relates to reducing the number of entries in a lexicon or dictionary that are considered valid candidates for an unverified string of characters, and more particularly relates to a system and method for comparing strings that have undergone optical character recognition (OCR) analysis with valid entries in a lexicon.

BACKGROUND ART

Optical character recognition (OCR) systems have continued to improve, but such systems are not always able to fully identify strings of input characters with valid words or combinations of words. Such systems may not be able to correctly identify input strings because of input errors or mis-identified characters which may lead to identification of a string that is not in a dictionary available to the system. Or, the system may not be able to identify all of the characters in a string. Another difficulty arises when an OCR system makes mistakes in determining the segmentation points between characters or between words of a string. Therefore, verification of the results of OCR analysis is desirable.

In the prior art, it is known to compare the unverified or unknown string to a dictionary or lexicon of similar strings to try to find the closest valid entry in the dictionary. However, the dictionary may be very large, as in the case of a dictionary of city names. When the dictionary is large, the processing time required for comparing the unverified string with all of the entries in the dictionary may be prohibitive.

Therefore, others have attempted to reduce the size of the dictionary before comparing the entries to the unverified string. Such a limitation of the dictionary might be based on some of the information that has been read by the system. For example, a dictionary of street names might be limited to those streets in the zip code that has been detected by the system. An inherent problem with this approach is that if the information relied upon (in the example, the zip code) has been mis-identified, a completely irrelevant portion of the dictionary will be used for comparison.

Another dictionary limiting approach has been to use the first three characters of the string as a retrieving key. That is, only those entries in the dictionary which share the first three characters of the unverified string are considered. This approach is subject to problems if there are identification errors in this part of the string. Furthermore, in optical character recognition methods a tendency to shape confusion is inherent because of the similarities in the shape of different letters. This is not taken into account in the retrieving key approach, which therefore risks eliminating relevant portions of the dictionary. Another example of prior attempts to limit dictionaries is to use the length of the unverified string as a retrieving key. According to this method, entries in the dictionary that are shorter or longer than the unverified string by a predetermined amount are not considered. This approach has a disadvantage in that it does not use the content of the string to find similar dictionary entries. As a result, it may provide too big a list to adequately reduce processing time in subsequent steps.

An alternate approach has been to encode the unverified string and the dictionary entries and then to compare the encoded versions. N-gram encoding techniques have been applied to compare n-gram vectors representing the unverified string and the individual dictionary entries. An non-positional n-gram vector is formed by considering each set of n adjacent characters in the string and assigning a zero or one to the bit of the vector corresponding to that character combination. For example, a bi-gram vector based on the English language alphabet would have bits representing the character combinations AA, AB, AC, AD . . . ZW, ZX, ZY, ZZ, for a total of 676 entries. N-gram encoding techniques are described in Cavnar, W. and Vayda, A., "Using Superimposed Coding of N-Gram Lists for Efficient Inexact Matching," USPS Advanced Tech. Conf.(5), Vol. 1., pp. 253–67, and in Riseman, E. and Hanson, A, "A Contextual Postprocessing System for Error Correction Using Binary n-Grams," IEEE Trans. on Computers, Vol. C-23, No. 5, May 1974, pp. 480–93, which are incorporated herein by reference.

As in the case of direct comparison of an input string to a large number of dictionary entries, comparing n-gram representations may also consume a large amount of computational time. Also, if a system encodes an entire lexicon with non-positional n-gram encoding, a match does not mean that the string is a dictionary word. This ambiguity arises because one only determines if there is a common characteristic with the dictionary as a whole. On the other hand, n-gram comparisons have the benefit of simple binary inexact matching, are faster than many other comparison schemes, and can save some space when the string and dictionary entries are hashed to sets of possible n-grams. However, in prior systems, the problem of computational expense remains, as all known encoding methods compare the unverified vector to every encoded dictionary entry. Prior systems lack an efficient way to reduce the search space before doing direct comparisons of strings or their vector representations.

Thus, a need exists in the art for an efficient system and method for comparing unverified strings to the entries of a dictionary or lexicon, in order to reduce the valid dictionary candidates to be considered as possible correct matches for the unverified string. There is also a need for such a method which does not exclude relevant parts of the lexicon and is capable of generating a short list of candidates that have a high likelihood of including an accurate match.

SUMMARY OF THE INVENTION

The present invention solves the above-described problem in the art by providing an efficient system and method for reducing a dictionary or lexicon to candidates that have a high likelihood of matching an unverified string. The present system and method can utilize up to three steps to reduce the lexicon, each step operating on a smaller portion of the lexicon resulting from operation of the previous step.

Generally described, the present invention provides a system and method for comparing strings with entries of a lexicon, by partitioning representations of the entries of the lexicon into groups based on one or more characteristics of the entries; indexing the entries based on one or more characteristics of the groups into an index comprising buckets mapped to the lexicon; partitioning a representation of an unverified string into groups based on the same characteristics used to partition the lexicon entries; indexing the unverified string to the index based on the same characteristics used to index the lexicon entries into the index; and comparing the representation of the unverified string with representations of only those lexicon entries that are commonly indexed to a selection of the buckets to which the unverified string is indexed. In a preferred embodiment of the invention, the groups into which the representations are partitioned are ranked, for example, by how often the selected characteristics occur in the lexicon.

In a preferred embodiment of the invention, the step of partitioning a representation of an entry comprises forming an n-gram vector representing the entry; folding the n-gram vector into a signature vector of reduced bit length; and partitioning the signature vector into groups each having a predetermined number of bits. The bits of the groups are preferably arranged in descending order of frequency of appearance of each bit in the lexicon. The step of indexing the entries preferably comprises determining a set of group numerical values, one for each group of the signature vector of an entry, based on the group's bit values; establishing a bucket for each group of the signature vector having a bucket address equal to the group numerical value; and mapping the entry into all the buckets having a bucket address equal to one of the group numerical values. If any groups of a partitioned signature vector have the same group numerical value, the duplicative group or groups are ignored.

The step of indexing entries preferably further comprises determining group numerical values for the groups of the remaining signature vectors of the lexicon; establishing buckets and bucket addresses for all group numerical values determined; and mapping each remaining entry of the lexicon into all the buckets having a bucket address equal to one of the group numerical values for the groups of the entry's partitioned signature vector.

The partitioning and indexing of the lexicon entries produces a fixed result for a given lexicon. Therefore, it can take place before it is necessary to analyze any unverified strings, and need not be repeated for each unverified string. This reduces time required for analyzing unverified strings when the identity of the string must be found quickly. Fast identification of strings can be important. For example, unverified strings may be read on labels of rapidly moving parcels. The time allowed for identifying all the address information on the label before the parcel reaches an automatic sorting station may be a matter of seconds.

The steps of partitioning and indexing an unverified string preferably comprise forming an n-gram vector representing the unverified string; folding the n-gram vector into a signature vector of reduced bit length; partitioning the signature vector into groups each having a predetermined number of bits; determining a set of group numerical values, one for each group of the signature vector of the unverified string, based on the group's bit values; and mapping the unverified string into at least the bucket having a bucket address equal to the group numerical value for the first group of the unverified string's signature vector. The first group preferably includes bits having the highest frequency of appearance in the lexicon. The bit values may comprise 1's and 0's, and the group numerical values may comprise decimal numbers corresponding to the binary number formed by the bit values of a group.

Referring now to the comparing step following partitioning and indexing, the representations of the unverified string and the lexicon entries preferably comprise folded n-gram signature vectors, and the comparing step preferably comprises determining coincidence of corresponding bits of the unverified string n-gram signature vector and each of the lexicon entry n-gram signature vectors indexed to the same buckets as the unverified string. Then it is possible to define a reduced portion of the lexicon limited to those entries whose n-gram signature vectors have a normalized coincidence of corresponding bits higher than a predetermined coincidence threshold.

Finally, the invention may optionally compare the unverified string in its original form and the entries of the reduced portion of the lexicon in their original form. This preferably involves the steps of conducting a transformation cost analysis between the unverified string in its original form and the entries of the reduced portion of the lexicon in their original form; and defining a final list of candidate entries comprising entries having a normalized transformation cost score below a predetermined cost threshold.

Those skilled in the art will appreciate that the first step of lexicon reduction, involving partitioning and indexing, is application-independent, while the subsequent vector and string comparison steps can be made more efficient by tailoring them to the application, such as OCR, which generates the unverified string. However, it should also be understood that the first step can be made to be application dependent.

According to another aspect of the present invention, a method of preparing a lexicon for comparing strings with entries of the lexicon is provided, comprising the steps of partitioning representations of the entries of the lexicon into groups based on characteristics of the entries; and indexing the entries based on characteristics of the groups into an index comprising buckets mapped to the lexicon.

According to still another aspect of the present invention, the preferred three-step process for reducing lexicon size may generally be described as defining a first portion of the lexicon by selecting entries of the lexicon whose encoded representations share characteristics with an encoded representation of an unverified string; defining a second portion of the lexicon comprising some of the entries of the first portion by directly comparing an encoded representation of the unverified string with encoded representations of the entries of the first portion of the lexicon; and defining a third portion of the lexicon comprising at least one of the entries of the second portion by directly comparing the unverified string in its original form and the entries of the second portion of the lexicon in their original form.

Thus, it is an object of the present invention to provide an improved method and system for comparing an unverified string to the entries of a dictionary or lexicon.

It is a further object of the present invention to provide an improved method and system for preparing a lexicon for comparing strings with entries of the lexicon.

It is a further object of the present invention to provide an improved method and system for reducing the portion of a lexicon to be compared with unverified strings so that the remaining entries have a high likelihood of containing a match for the unverified string.

It is a further object of the present invention to provide an improved method and system for comparing an unverified string to the entries of a dictionary or lexicon, which is computationally efficient and accurately limits the lexicon to a small number of candidates.

Other objects, features and advantages of the present invention will become apparent upon reviewing the following description of preferred embodiments of the invention, when taken in conjunction with the drawing and the appended claims.

BRIEF DESCRIPTION OF THE DRAWING FIGURES

FIG. 4A illustrates diagrammatically the process of FIG. 2 for forming a folded signature vector.

FIG. 4B illustrates diagrammatically the process of the partitioning and hashing steps of FIG. 2.

FIG. 5 illustrates diagrammatically an example of processing a particular lexicon entry.

FIG. 6 is a diagrammatic view of an imaging system embodying the present invention.

DETAILED DESCRIPTION

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Figure 1A:
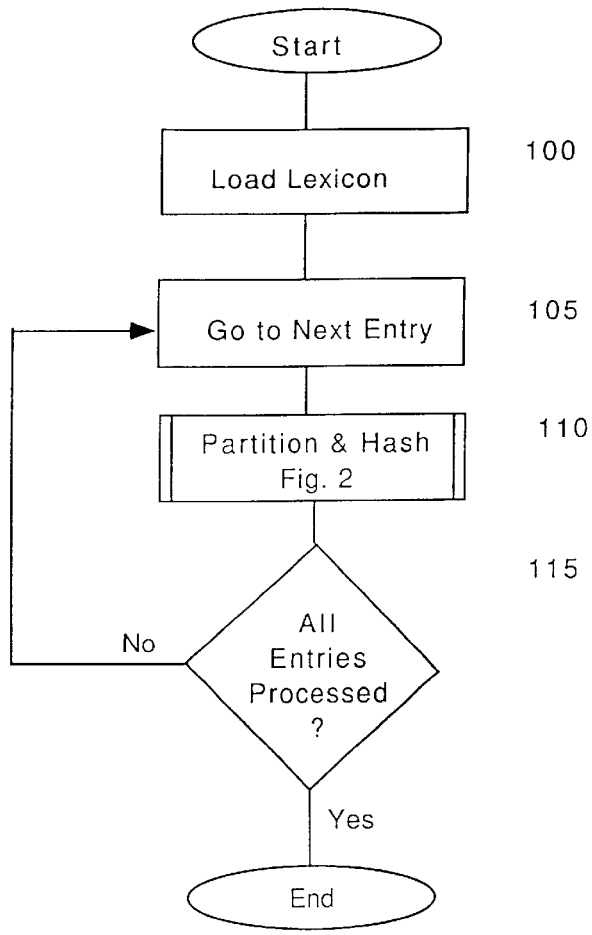
FIG. 1A is a system flowchart outlining the steps of the technique of the present invention for indexing a lexicon.
Figure 1B:
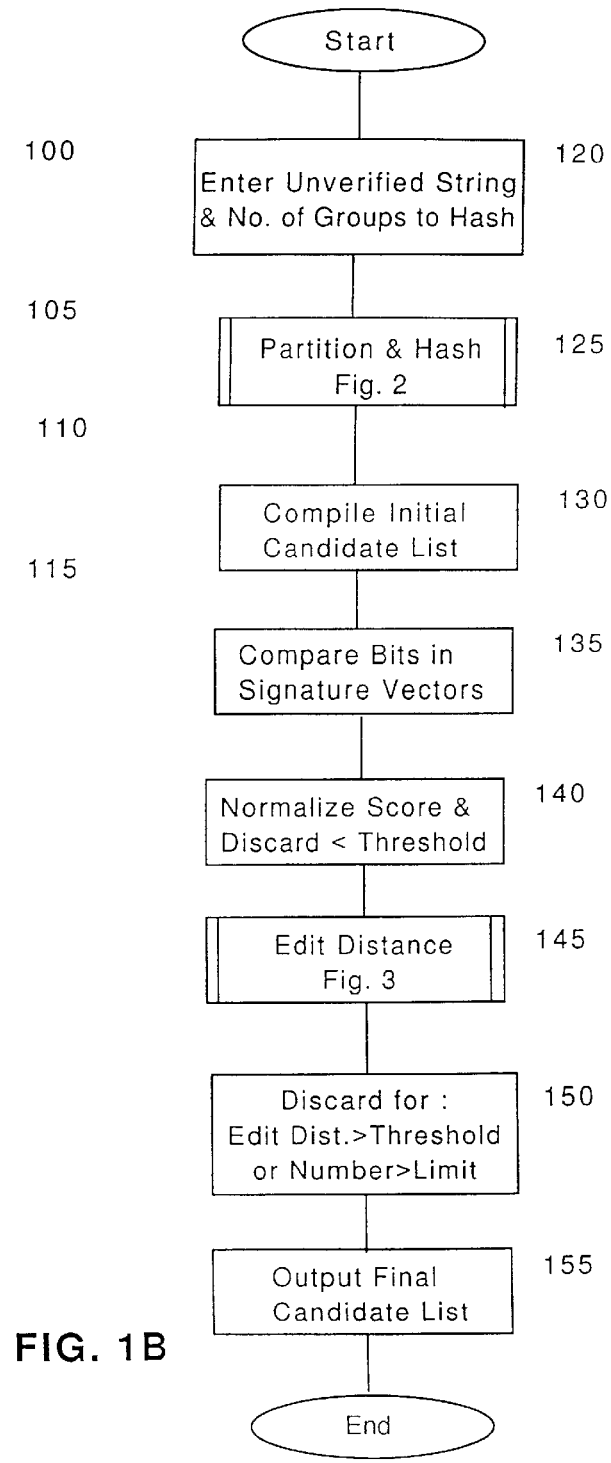
FIG. 1B is a system flowchart outlining the steps for processing an unverified string.

Referring now in more detail to the drawing, in which like numerals refer to like parts throughout the several views, FIGS. 1A and 1B show system flowcharts of the method of lexicon reduction carried out by a system according to the present invention. The method may be used, for example, to validate or identify a character string from an image of an address label or the like, after processing by a character recognition system. The purpose of the method is to take a dictionary or lexicon and narrow down the number of names from the lexicon that will be taken as the best matched candidates for an unverified string of characters.

An example of such a lexicon would be a list of city names in the United States, which could contain about 45,000 valid entries. The unverified string might be generated by intensive OCR processing, from a relevant field (such as city name in an address). There may be errors or problems in the unverified string that make it hard to identify. The term "string" is used broadly herein to refer to individual words or sequences of words or other characters. For example, in the sequence "132 Front St., Elm Wood, Ind. 45509" the entire sequence may be a string, as well as the individual components or any combination thereof. In this example, the city name field contains "Elm Wood."

As described in detail below, there are two phases of the present method, (1) static manipulation of the lexicon itself (FIG. 1A), and (2) use of the unverified string to dynamically manipulate the lexicon to arrive at a short list of candidate correct strings (FIG. 1B). The first phase involves pre-calculating characteristics of the lexicon to reduce real time processing time. The second phase in turn has up to three steps. The first step uses a multi-fold hashing approach to find one or more linked lists of lexicon strings which share characteristics with the unverified string to form an initial candidate list. The second step then uses a folded bi-gram matching based method to filter the list and generates a second candidate list. The third step applies an edit distance based method to further filter the list and generate a final candidate list.

"Internal" Lexicon processing

As noted, the first phase of the method involves only the valid lexicon strings (such as legal and correct city names). Referring to FIG. 1A, the lexicon is loaded into memory at step 100 of the flowchart. All lower case letters are mapped to their upper case letters, all between word spaces are stripped, and all non-alphanumeric characters are mapped to a selected specific non-alphanumeric character (for example, "?"). To begin processing, an entry of the lexicon is selected at step 105, and at step 110 a partitioning and hashing subroutine shown in detail in FIGS. 2, 4 and 5 is carried out for the selected entry, which is represented at 20 in FIG. 4.

Figure 2:
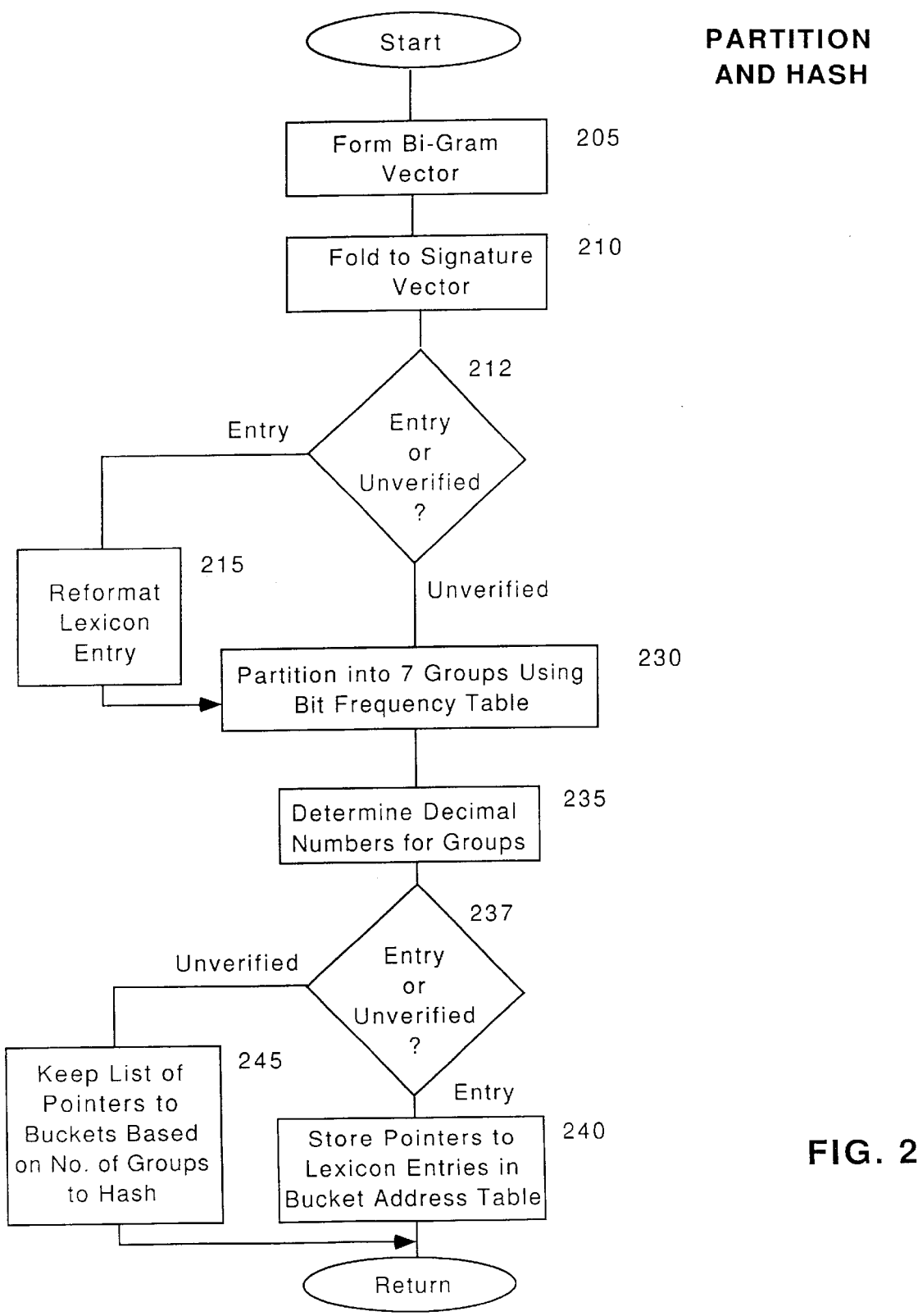
FIG. 2 is a flowchart of the partitioning and hashing subroutine of FIG. 1.

Referring to FIG. 2, a non-positional bi-gram vector for the lexicon entry string 20 is formed at step 205. Shown in FIG. 4A as bi-gram vector 22, of length 26×26=676 bits, its elements are 1's and 0's corresponding to whether each possible bi-gram of the English alphabet occurs in the string. N-gram encoding, of which bi-gram encoding is an example, is well known to those skilled in the art. Bi-gram encoding is preferred, although other n-grams, such as tri-grams could be used. The vector 22 is folded at step 210 by examining each sequential group of 8 bits and assigning it a 1 or a 0 depending on whether any of the bi-grams in the group was previously "set" (had a value of 1). As shown in FIG. 4A, the first bit of the folded vector is based on bits AA through AH of the bi-gram vector, the second group is based on bits AI through AP, etc. The final group examined has only 4 bits. This results in an 85 bit vector 25 called the signature vector of the string. All the signature vectors for the lexicon can be pre-calculated. The original lexicon entry is reformatted at step 215 with each line containing the original string and its corresponding signature vector.

The same sequence of bi-grams (AA–AH, AI–AP, ...) occurs in the signature vector of every lexicon entry. Prior to the static processing of the lexicon, these signature vector bits may be ranked. A counter is accumulated for each of the 85 bits, counting the frequency at which each bit (considering the 8 bi-grams for each bit) occurs in the lexicon. The 85 bits are then sorted in descending order by their corresponding frequencies, starting with the largest counter value (set of bi-grams most frequently found in the lexicon). The sorting process results in a bit frequency table which is then used in the manner described below to partition signature vectors of lexicon entries and also of unverified strings.

Referring now to FIG. 4B, the signature vector 25 is partitioned at step 230 into seven groups 30–36 of 12 bits each, $g_{i,1} \ldots g_{i,12}$, where i=1–7, as shown in FIG. 4B. The last (85th) bit of the signature vector is discarded. In the partitioning process, the first group (i=1) is assembled using the bit frequency table for the lexicon. A bit mask is created having twelve bit positions corresponding to the twelve most frequently occurring bits, that is, those bits at the top of the bit frequency table. To partition the signature vector of a particular lexicon entry, the same bits are compared to the bit mask. Only if the bit is set to "1" in the entry's signature vector is the corresponding bit of the first group set to "1." For example, if bit no. 2 (AI through AP) contains the bi-grams having the most frequent occurrence in the lexicon, bit $g_{1,1}$ will be given a value corresponding to bit 2 of the entry's signature vector. That is, if any of the bi-grams AI through AP are set in the bi-gram vector, bit 2 of the entry's signature vector will have been set, and bit $g_{1,1}$ of the first group of the entry's partitioned signature vector will be set. The same process is used to assemble the other bits of the first group, and then the bits of the other six groups. Thus, the first group gives the best feature subset (bit positions in a signature vector) based on the statistics on a given lexicon, the next group gives the second best subset, and so on.

The foregoing partitioning process is application independent. However, the partitioning of signature vectors may be done in a manner that is application dependent. For example, if the application is an OCR engine, the partitioning process could be related to the application by folding bi-grams of the same shape into the same bit, and those of distinct shape into different bits, and bi-grams with more "conflicts" in different bits, etc.

Each group of 12 bits may be considered as a 12 bit binary number, which can be translated at step 235 into a decimal number between 0 and 4095 (for example, if the group's bit pattern was: 000000000011, then the decimal number would be 3). These numbers are used to create a bucket address table 40. Each bucket address may eventually have more than one bucket, as shown at address 0, if needed to accommodate multiple signature vectors indexed to that address. The capacity of each bucket may be, for example, 100 pointers. All the buckets sharing a bucket address form a linked list. In the example of the city names lexicon, some addresses are not used, whereas the largest linked list may have as many as 73 buckets.

For lexicon entry processing, the method goes to step 240, where these decimal numbers for each of the 7 groups of the partitioned signature vector 30–36 are used to "hash" the signature vector to up to seven linked lists. As shown in FIG. 4B, a bucket address table 40 is provided consisting of addresses numbered 0 to 4095. For each group 30–36, a pointer 42 to the signature vector's entry 45 in the lexicon is stored in a bucket 43 associated with the bucket address equal to the decimal number of the group (duplicate decimal numbered groups of the same signature vector are thrown out). The pointer points to the address of the string in the lexicon. The hashing step is done for all the groups 30–36 of the signature vector 25. When all non-duplicative groups of the signature vector 25 have been hashed to the bucket address table, the pointer 42 to the lexicon address associated with the signature vector 25 has been stored at several bucket addresses. This redundancy provides a mechanism for rapidly constructing the initial candidate list. It also provides error tolerance.

At this point, the method returns to the main routine of FIG. 1A, where at step 115 it is determined whether all the entries of the lexicon have been processed. If not, the method returns to step 105 and the next lexicon entry is selected. Thus, the partitioning and hashing subroutine of FIG. 2 is run for each entry of the lexicon. The indexing or hashing step 240 is carried out for all the entries of the lexicon. When the entire lexicon is processed, many of the individual bucket addresses will be associated with varying numbers of the entries of the lexicon. All the foregoing steps are completed in advance of actual matching to any unverified string. The group partitioning and the linked list table 40 are fixed for a particular lexicon.

FIG. 5 shows an abbreviated example of the operation of the subroutine of FIG. 2 on a valid lexicon entry 20', hypothesized to be the city name string "ADAMS." This string is assumed to be the 45th entry in the lexicon. The bi-gram vector 22' includes bits AD and AM set to "1", and it will be understood that all the bits corresponding to bi-grams found in the string will be set to "1" while the other bits will be "0." When the bi-gram vector 22' is folded, the bit AD will fall in the first eight bits, so the first bit of the signature vector 25' will be set to "1." This will also be true for the second bit of the signature vector, because the bit AM falls in the second eight bits of the bi-gram vector 22'. Those skilled in the art will understand that the remaining bits of the signature vector are determined in similar fashion.

When the signature vector is partitioned, the first group 30' will contain the bits of the signature vector that occur most frequently in the lexicon. Assuming for illustration that $g_{1,6}$ and $g_{1,11}$ are bits set to "1," then the binary number formed by the values of the bits of group 30' is 000001000010, which corresponds to the decimal number 66. Therefore, the 45th lexicon entry is linked to bucket address no. 66 in the bucket address table.

Reducing the Lexicon Based on the Unverified String

The goal now is to find a small subset of the lexicon which shares characteristics with the unverified string. The chances of the correct match being in this subset of the lexicon must be high.

First, at step 120 of FIG. 1B, an unverified string 20 is entered, along with the number of groups of its signature vector to be hashed, as will be explained below. At step 125, the unverified string is processed by the partitioning and hashing subroutine of FIGS. 2 and 4. In essentially the same way as this subroutine processed each valid lexicon entry, it now proceeds through steps 205–235 to form a signature vector for the unverified string, and to partition the signature vector into 7 groups.

The decimal numbers translated from the binary numbers formed by the group elements may then be mapped to addresses in the lexicon's bucket address table 40 at step 245. The user has chosen at step 120 how many groups of the unverified string signature vector should be mapped (remembering that the first group contains the folded bi-grams most frequently found in the lexicon). The number of groups "hashed" to the bucket address table determines the size of the initial list of candidate entries for the unverified string, and therefore the processing time required by subsequent steps. There is a trade-off between speed and certainty of including the correct lexicon entry. Each member of the initial candidate list shares some common feature with the unverified string in the sense that the bit pattern of at least one group in the candidate's signature vector is the same as that of a group of the unverified string's signature vector. When more than one group is hashed, the linked lists for each group optionally may be linked together to speed processing.

A list of the pointers to the bucket addresses associated with the unverified string is stored. The content and length of this list of pointers will depend on the number of groups selected to be hashed.

The process then returns from the subroutine of FIG. 2 to the main routine of FIG. 1B. At step 130, all of the valid lexicon entries having pointers in buckets addressed by the selected groups of the unverified string are taken as the initial candidate list. Because these entries share characteristics with the unverified string, there is a high likelihood that the truth value of the unverified string will be found in the candidate list. Hashing the first group 30 of an unverified string's signature vector to a table for the city names lexicon has been found, for example, to reduce the number of possible candidate names from the original 45,000 to about 145. This number is based on an average number of buckets of 1.45 per linked list for occupied bucket addresses, assuming the buckets have a capacity of 100 pointers.

Further Reducing the Lexicon by Comparing Vectors

Considering only the initial candidate set identified at step 130, the process at step 135 compares the signature vectors of the unverified string and that of each initial candidate entry, and calculates the number of matched corresponding "ON" (value is 1) bits in the compared vectors. For example, the number of matched "ON" bits between 0011 and 1011 is 2. The scores are normalized and thresholded at step 140. Normalization is based on the number of set folded bits in the lexicon entry; that is, the normalized score is (matched bits/entry's set bits). The normalized score thus lies between zero and one. Only those entries with a normalized score above the threshold are kept in the set of candidate entries. The threshold can be set to control how many candidates survive this reduction step. For the city names lexicon example, the threshold when one group is hashed may be 0.45, and may be 0.35 when any additional number of groups is hashed. The threshold should be selected to clear enough candidates so that the next step can recover from errors, but not so low as to require too much processing time in the next step.

Further Reducing the Lexicon by Comparing Strings

Figure 3:
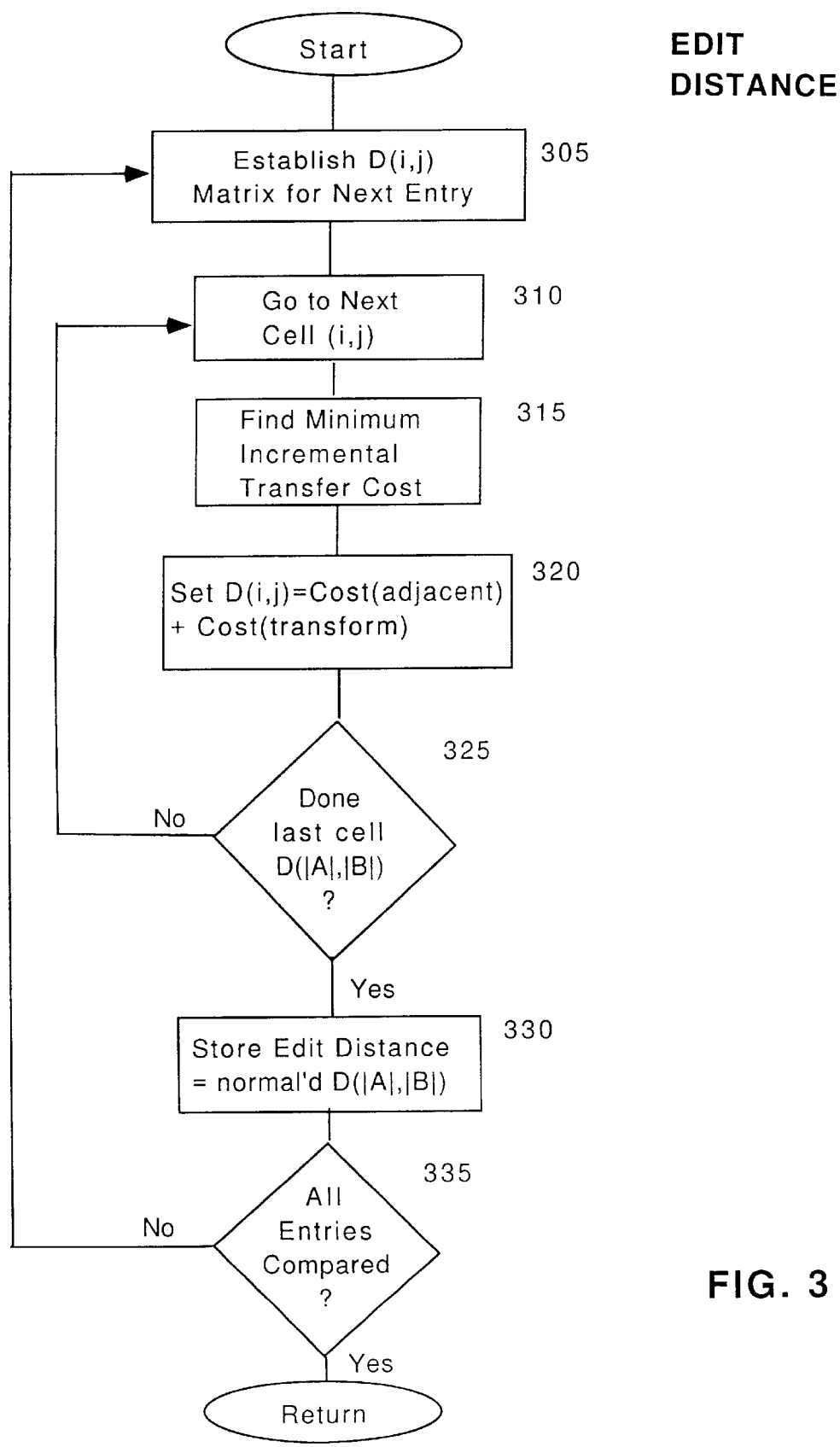
FIG. 3 is a flowchart of the edit distance subroutine of FIG. 1.

At step 145, the process calls an edit distance subroutine, as shown in FIG. 3. The purpose of this subroutine is to compare the strings themselves (unknown and remaining candidates) to determine which of the remaining candidates are closest to the unverified string. The subroutine uses a novel method for weighting the sequence of operations needed to transform the unverified string into the candidate strings, or vice versa. The minimum total weighted "cost" of the transformation is called the "edit distance." Candidate strings having a normalized edit distance above a threshold are discarded, leaving only those candidate strings having a normalized edit distance below the threshold in the final list of candidates. The threshold may be set to limit the final list to a set number of candidates, preferably 10 candidates or less.

This final step preferably is optimized for a particular application, such as OCR. This is because the cost of transformation operations depends upon how similar characters appear. For example, certain letters have similar shapes and are commonly confused by OCR engines. Substitution of these letters for one another therefore has a low cost.

The invention uses a method for determining the cost of a transformation of the type described in Lowrance, R. and Wagner, R., "An Extension of the String-to-String Correction Problem," *J of the Assoc. for Computing Machinery*, Vol. 22, No. 2, April 1975, pp. 177–83; Wagner, R. and Fischer, M., "The String-to-String Correction Problem," *J of the Assoc. for Computing Machinery*, Vol. 21, No. 1, January, 1974, pp. 168–73; and Masek, W., "A Faster Algorithm Computing String Edit Distances," *J Computer & Systems Sciences*, Vol. 20, pp. 18–31 (1980), which are incorporated herein by reference. This type of method uses "dynamic programming" to calculate costs for transforming one string to another, to find the edit distance (minimum cost). The operations performed on characters of one string to transform it into the other string include: insertion, deletion, substitution, and transposition of two adjacent characters. For OCR applications, the following costs may be assigned to three of these operations:

insertion cost=1
deletion cost=1
transposition cost=1.5

The substitution cost should depend on the likelihood that one character will be mistakenly identified as the other. Characters with similar shapes, such as "5" and "S", might often be mistaken for one another, and therefore a small cost is assigned to the substitution. Normally, there are 36 characters to be considered (26 English letters and 10 digits). Lower case letters are mapped to their upper case counterparts before calculating costs. Preferably, a 36×36 look up table is created and stored, containing the substitution costs for all possible substitutions. Different tables can be created for different OCR engines. One may construct the table by finding the percentage of attempts an OCR engine misidentifies one character as another over a training set of classes. Then, one may assign the complementary percentage as the cost of the substitution. For example, if 70% of the time the engine recognizes "6" as "G" in the training set, the "6 for G" substitution cost=1−0.7=0.3.

This information may be used to divide each character and its 36 associated cost values into four groups:

(a) same shape (cost assigned=0);
(b) similar shape (cost assigned=0.65);
(c) less similar shape (cost assigned=0.8);
(d) different shape (cost assigned=1).

The user may wish to adjust some of the table values to account for the effect of bias from both the training set and the OCR engine, based on experimental results and similarity of shape. Preferably, the table should also be adjusted to make the cost of complementary substitutions equal: cost (x,y)=cost(y,x). Table 1 is a key to the values of a 36×36 table determined for one OCR engine:

TABLE 1

| Character | 0.65 | 0.8 |
|---|---|---|
| 0 | OQCDU | |
| 1 | I | ZLT |
| 2 | Z | R |
| 3 | 8 | JB |
| 4 | A | X |
| 5 | S | |
| 6 | | G8 |
| 7 | T | F |
| 8 | BS3 | R6 |
| 9 | | P |
| A | 4 | X |
| B | 8R | 3S |
| C | 0OQ | G |
| D | P0O | |
| E | F | GZS |
| F | EP | 7T |
| G | | QC6SE |
| H | N | WMK |
| I | 1 | TJZY |
| J | | I3 |
| K | R | XYH |
| L | | 1 |
| M | | HN |
| N | H | MWU |
| O | 0CQDU | |
| P | DF | 9 |
| Q | 0OC | UG |
| R | KB | X82 |
| S | 58 | GBE |
| T | 7 | F1IY |
| U | V0O | WQN |
| V | YU | W |
| W | | HNUVY |
| X | | 4AKR |
| Y | V | WIKT |
| Z | 2 | 1EI |

An example, at the intersection of the "F" row of the look up table and the "P" column, the cost value 0.65 will be stored. At the intersection of the "F" row of the look up table and the "T" column, the cost value 0.8 will be stored. At the intersection of the "F" row of the look up table and the "F" column, the cost value 0 will be stored. At the intersection of the "F" row of the look up table and all columns other than "F," "E," "P," "7," or "T," the cost value 1 will be stored.

Those skilled in the art will understand that other techniques could be used to determine substitution costs. For example, one could base substitution costs on the frequency of typographical errors made by typists. However, this approach does not deal with errors that are specific to OCR analysis, such as mis-classification.

Turning now to FIG. 3, at step 305 a table or matrix D is established with rows representing the characters of a string A having a length |A| and columns representing characters of a string B having a length |B|. Thus, D is an |A|×|B| matrix. In each cell of the matrix, D(ij) is the minimum cost of transforming the first i characters from string A to the first j characters of string B. D(|A|,|B|) is the final cell of the matrix, containing the minimum cost of transforming the entire string A to the entire string B (the edit distance between the strings). A template of the matrix D is shown in the following Table 2:

TABLE 2

| String | | String B | | | |
|---|---|---|---|---|---|
| A | A | D | A | M | S |
| A | D(1,1) | | | | |
| P | | D(i-1,j-1) | D(i-1,j) | | |
| X | | D(i,j-1) | D(i,j) | | |
| N | | | | | |
| B | | | | | D(|A|,|B|) |

To determine D(|A|,|B|), the dynamic programming method proceeds at step 310 to go to the next cell, which starts at cell (1,1). The method first determines D(1,1), then fills the other cells of the first row from left to right, and then the cells of the remaining rows column by column within each row. At each cell, the value will be calculated based on the cost value already calculated for one of the preceding adjacent cells, plus the incremental minimum cost of an additional transformation operation needed to obtain the substring of string B through column position j. The cost values at the preceding adjacent cells are D(ij-1), D(i-1,j), and D(i-1,j-1). Following the method described in the Lowrance and Wagner article, one of these cells will provide a starting cost value for the minimum cost D(i,j). For each cell (i,j), all four transformations are compared:

(1) cost to insert a new character: D(ij-1)+insert cost of B(j);

(2) cost to delete an old character: D(i-1,j)+delete cost of A(i);

(3) cost to substitute characters: D(i-1,j-1)+substitute cost A(i)⎯B(j);

(4) cost to transpose characters: See p. 182 of Lowrance and Wagner article, "ALGORITHM S," line 19, and accompanying explanation. In the article, H[i,j] is a minimal cost function.

Generally described, with reference to Part 5.(4) of the article on page 181, this transposition step starts at a position (x,y), where there is a touch line (as explained in the article) between x and j, and another touch line between i and y. The total cost is D(x-1,y-1)+T, where T is the incremental transposition cost. Cost T is a combination of deletion, insertion, and substitution costs. The first string has positions:

$$1, \ldots, x, \ldots, i.$$

(a) First, delete the characters at the positions x+1 through i-1, leaving:

$$1, \ldots, x, i.$$

(b) Then, insert between x position and i position the characters of the second string from positions y+1 through j-1, leaving:

$$1, \ldots, x, y+1, \ldots, j-1, i.$$

(c) Finally, substitute j for i:

$$1, \ldots, x, y+1, \ldots, j-1, j.$$

The cost T is the sum of the deletion, insertion, and substitution costs of steps (a), (b), and (c). As D(x-1, y-1)

is the cost of transforming the positions 1, . . ., x, then adding the cost T provides the total cost using transposition.

At step 315, these calculations are performed and compared to find the minimum incremental transformation cost. At step 320, D(i,j) is set to be the minimum of the results of (1)–(4) above. If cells remain to be filled, at step 325 the method returns to step 310 and advances to the next cell. Steps 315 and 320 are repeated for this cell. When it is determined at step 325 that the last cell, (|A|,|B|) has been filled, the transformation cost calculations are complete. At step 330, the value of D(|A|,|B|) is normalized by the average of the lengths of the strings, (|A|+|B|)/2, and the edit distance is set to normalized D(|A|,|B|) and stored. At step 335, the program tests to determine whether the unverified string has been compared to all of the second level candidate entries of the reduced lexicon. If not, the method returns to step 305 and establishes a matrix for the next candidate entry. Steps 305 through 330 are repeated until an edit distance has been determined and stored for all of the second level candidate entries.

At this point, the method returns to the main routine of FIG. 1, and at step 150 a threshold test is applied to the edit distance values to select the final candidate list. The threshold may be set at (1) a certain number of candidates having the lowest normalized edit distances from the unverified string, or (2) a certain normalized edit distance, below which an undetermined number of candidates will be accepted as in the final list, or (3) up to a certain number of candidates not exceeding a certain normalized edit distance. Also, the threshold may vary with the number of groups that were hashed to the bucket address table. As an example for the city names lexicon, the final threshold may be as follows:

TABLE 3

| No. of Groups | 7 | 6 | 5 | 4 | 3 | 2 | 1 |
|---|---|---|---|---|---|---|---|
| Threshold | .34 | .34 | .31 | .31 | .31 | .27 | .22 |

The final candidate list is output at step 155.

Referring now to FIG. 6, the present invention may be embodied in an imaging system 10 for acquiring an image of a label 12 attached to a parcel 11. A camera 14, preferably incorporating a CCD detector, is positioned over the path of the parcel 11. The camera 14 is operated in a known manner to acquire an image of the label 12. Alphanumeric characters in the image are subject to analysis in a processor 16, which may be, for example, a SPARC2 workstation. The processor includes an OCR engine, which may be one of several known in the art. The OCR engine attempts to identify the characters and to segment them into words. The processor 16 also is configured to carry out the method of the present invention. The input to the present method includes entries of a lexicon stored in a memory device associated with the processor 16, and imaged unverified strings. Output devices (not shown) may be connected to the processor to display, transmit, or print the final list of candidates as well as any intermediate data the user wishes to review. One imaging system suitable for acquiring images of characters is disclosed in U.S. Pat. No. 5,308,960, which is incorporated herein by reference.

Performance of the present system and method can be seen from the following Example:

EXAMPLE

The foregoing method is applied using a SPARC2 workstation to a lexicon of about 45,000 city names, and as unverified inputs, about 670 city names generated by an OCR engine from actual real world address images, along with their truth values (visually determined and key entered). Hashing only the first group of each "unverified" signature vector to the bucket address table yields about a 56% correct rate (with the truth string among the top 10 final candidates), and a 1.3% error rate (the valid string is not in the final list). The remaining 42.7% of the unverified strings were rejected, that is, no candidates were found in the lexicon. The average speed is about 53 milliseconds per input.

When the top five groups are hashed, the correct rate rises to about 85% with a 2.4% error rate (12% rejected), at an average speed of about 691 ms per input.

From the foregoing it will be seen that the invention provides a system and method for more efficiently comparing an unverified string to a lexicon, and filters the lexicon through multiple steps to reduce the number of entries to be directly compared with the unverified string. The method begins with the partitioning and hashing step, which is the least computationally expensive. It then proceeds to the encoded vector comparison step, and finally the direct string comparison of the edit distance step, which is the most computationally expensive. A more expensive step or steps can be omitted if the previous step or steps have provided a match for the unverified string. The reduction of the lexicon takes into account the nature of the unverified string, and therefore is accomplished without arbitrarily eliminating any large portions of the lexicon that might contain relevant candidates. At the same time, the method avoids the need to compare the unverified string directly or indirectly with all the entries in the lexicon. The subset of entries compared differs for each unverified string, depending on the content of the unverified string. The final candidate list includes only highly possible and ranked candidates for the unverified string, and the size of the final list is adjustable.

It will be further understood that various changes in the details, materials, and arrangements of the parts and parameters which have been described and illustrated to explain the nature of the invention may be made by those skilled in the art without departing from the principle and scope of the invention as expressed in the following claims.

What is claimed is:

1. A method of comparing strings with entries of a lexicon, comprising the steps of:
   organizing entries of the lexicon by, for each entry:
   (a) forming an n-gram vector representing a lexicon entry;
   (b) folding said n-gram vector into a signature vector by combining multiple n-grams into bits;
   (c) creating a list of bits having the same n-grams as the bits of the signature vector, beginning with the bit occurring most frequently in the lexicon and continuing in descending order;
   (d) creating a partitioned vector whose element values are binary numbers whose digits represent the bits of the list of bits, partitioned into groups of digits forming the binary numbers, the digits being set or not set depending on whether the bit of the signature vector having the same n-grams is set;
   (e) establishing a plurality of buckets having addresses corresponding to all possible element values of the partitioned vector;
   (f) indexing said lexicon entry to the one or more of said buckets having an address corresponding to an element value of said lexicon entry's partitioned vector;

reducing the number of lexicon entries to be compared to a particular unverified string by:

creating a partitioned vector for said unverified string according to steps (a)–(d);

indexing said unverified string to those buckets whose addresses correspond to an element value of said unverified string's partitioned vector; and comparing a representation of said unverified string with representations of only those lexicon entries that are indexed to the bucket addresses to which said unverified string is indexed.

2. The method of claim 1, wherein said bucket addresses comprise decimal numbers corresponding to the binary number formed by the bit values of an element of the partitioned vector.

3. The method of claim 1, wherein said step of reducing the number of lexicon entries to be compared further comprises defining a reduced portion of the lexicon limited to lexicon entries indexed to buckets whose addresses correspond to selected elements of the partitioned vector.

4. The method of claim 1, wherein the representations of said unverified string and said lexicon entries in said comparing step comprise folded n-gram signature vectors.

5. The method of claim 4, further comprising the step of further reducing the lexicon to those entries whose folded n-gram signature vectors have, on comparison to the unverified string's folded n-gram signature vector, a normalized coincidence of corresponding bits higher than a predetermined coincidence threshold.

6. The method of claim 38, further comprising the step of comparing the unverified string in its original form and the further reduced entries of the lexicon in their original form.

7. The method of claim 6, wherein said step of comparing the unverified string in its original form and the entries of the further reduced entries of the lexicon in their original form comprises:

conducting a transformation cost analysis between the unverified string in its original form and the entries of the reduced portion of the lexicon in their original form; and defining a final list of candidate entries based on normalized transformation cost scores determined in said transformation cost analysis.

8. The method of claim 1, wherein said step of folding said n-gram vector into a signature vector comprises combining eight bits of said n-gram vector into one bit of said signature vector.

9. The method of claim 8, wherein said step creating a partitioned vector comprises partitioning said signature vector into groups of twelve bits.

10. A system for linking entries of a lexicon to an unverified string in an image, comprising:

an imager operative to acquire and store an image of a string of characters; and a processor configured to:

organize entries of the lexicon by, for each entry:

(a) form an n-gram vector representing a lexicon entry;

(b) fold said n-gram vector into a signature vector by combining multiple ngrams into bits;

(c) determine a list of bits having the same n-grams as the bits of the signature vector, beginning with the bit occurring most frequently in the lexicon and continuing in descending order;

(d) create a partitioned vector whose element values are binary numbers whose digits represent the bits of the list of bits, partitioned into groups of digits forming the binary numbers, the digits being set or not set depending on whether the bit of the signature vector having the same n-grams is set;

(e) establish a plurality of buckets having addresses corresponding to all possible element values of the partitioned vector;

(f) index said lexicon entry to the one or more of said buckets having an address corresponding to an element value of said lexicon entry's partitioned vector;

reduce the number of lexicon entries to be compared to a particular unverified string by:

creating a partitioned vector for said unverified string according to steps (a)–(d);

indexing said unverified string to those buckets whose addresses correspond to an element value of said unverified string's partitioned vector; and compare a representation of said unverified string with representations of only those lexicon entries that are indexed to the bucket addresses to which said unverified string is indexed.

11. A method of comparing an unverified string with entries of a lexicon, comprising the steps of:

for each entry of the lexicon, forming an n-gram vector representing the entry;

folding said n-gram vector into a signature vector of reduced bit length; and partitioning the bits of each signature vector of each entry of said lexicon into groups each having a predetermined number of bits arranged in descending order of frequency of appearance of each bit in the lexicon;

forming buckets of the entries of the lexicon indexed to bits of said signature vectors by indexing an entry to a bucket identified by numerical values associated with one or more of the groups, the numerical values each formed by all the bits of a group:

comparing a representation of the unverified string with representations of only those lexicon entries mapped to the buckets of a subset of said buckets, by:

forming an n-gram vector representing the unverified string;

folding said n-gram vector of the unverified string into a signature vector of reduced bit length; and partitioning the bits of the signature vector of the unverified string into groups each having a predetermined number of bits arranged in descending order of frequency of appearance of each bit in the lexicon, indexing the unverified string to said buckets based on the numerical values formed by the bits of one or more of the groups of the unverified string's partitioned signature vector, and comparing a representation of the unverified string with representations of only those lexicon entries indexed at least one of the same buckets as the unverified string.

12. The method of claim 11, wherein said numerical value is the binary number formed by the bits of the group.

13. The method of claim 12, wherein said bucket addresses comprise decimal numbers corresponding to the binary number formed by the bit values of the partitioned vector.

14. The method of claim 13, wherein said step of reducing the number of lexicon entries to be compared further comprises defining a reduced portion of the lexicon limited to lexicon entries indexed to buckets whose addresses correspond to selected groups of the partitioned vector.

15. The method of claim 14, further comprising the step of further reducing the lexicon to those entries whose folded n-gram signature vectors have, on comparison to the unverified string's folded n-gram signature vector, a normalized coincidence of corresponding bits higher than a predetermined coincidence threshold.

16. The method of claim 15, further comprising the step of comparing the unverified string in its original form and the further reduced entries of the lexicon in their original form.

17. The method of claim 1, further comprising the step of processing a second unverified string without further organizing the entries of said lexicon, by:
creating a partitioned vector for said second unverified string according to steps (a)–(d);
indexing said second unverified string to those buckets whose addresses correspond to an element value of said second unverified string's partitioned vector, and
comparing a representation of said second unverified string with representations of only those lexicon entries that are indexed to the bucket addresses to which said second unverified string is indexed.

* * * * *

UNITED STATES PATENT AND TRADEMARK OFFICE
CERTIFICATE OF CORRECTION

PATENT NO. : 5,774,588

DATED : Jun. 30, 1998

INVENTOR(S) : Liang Li

It is certified that error appears in the above-identified patent and that said Letters Patent is hereby corrected as shown below:

Column 15, line 30, after the word "claim", delete "38" and insert --5-- therefore.

Signed and Sealed this

Twenty-second Day of December, 1998

Attest:

BRUCE LEHMAN

*Attesting Officer*  *Commissioner of Patents and Trademarks*